United States Patent [19]
Harte

[11] 3,747,229
[45] July 24, 1973

[54] MANUAL SELF-INSTRUCTIONAL AND SELF-TESTING DEVICE

[76] Inventor: James Richard Harte, 10 W. Concord, Kansas City, Mo. 64112

[22] Filed: May 7, 1971

[21] Appl. No.: 141,289

[52] U.S. Cl. .................................. 35/9 R, 35/48 A
[51] Int. Cl. ............................................. G09b 3/08
[58] Field of Search .................... 35/9 R, 9 C, 48 R, 35/48 A

[56] References Cited
UNITED STATES PATENTS

| | | | |
|---|---|---|---|
| 1,644,160 | 10/1927 | Thompson | 35/48 A |
| 1,915,653 | 6/1933 | Dutton | 35/48 A |
| 3,139,688 | 7/1964 | Roop | 35/9 R |
| 2,790,251 | 4/1957 | Rhoten | 35/9 C |
| 3,477,144 | 11/1969 | Stillit | 35/9 C |

Primary Examiner—Wm. H. Grieb
Attorney—D. A. N. Chase

[57] ABSTRACT

This apparatus is a simple manually operated self-instructional and self-testing apparatus which has a plurality of holes in a flat impervious surface; an answer sheet, or question and answer sheet; and a shaped stylus. All question and answer sheets contain indicator zones that correspond to the answers of multiple choice or true-false questions. When a printed question and answer sheet is properly positioned on said flat surface, each indicator zone is directly above one of the holes in the flat surface. A stylus with a shaped tip is then used to perforate the indicator zones that the student believes correspond to the correct answers of the multiple choice or true-false questions. One hole of a small, intermediate, or large size or of a particular shape results when the stylus perforates an indicator zone. Different hole sizes or shapes thus produced in the question and answer sheet indicate whether the response is correct, partially correct, or incorrect.

13 Claims, 43 Drawing Figures

INVENTOR.
JAMES RICHARD HARTE
BY *James Richard Harte*

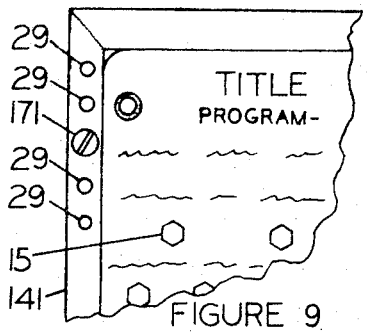
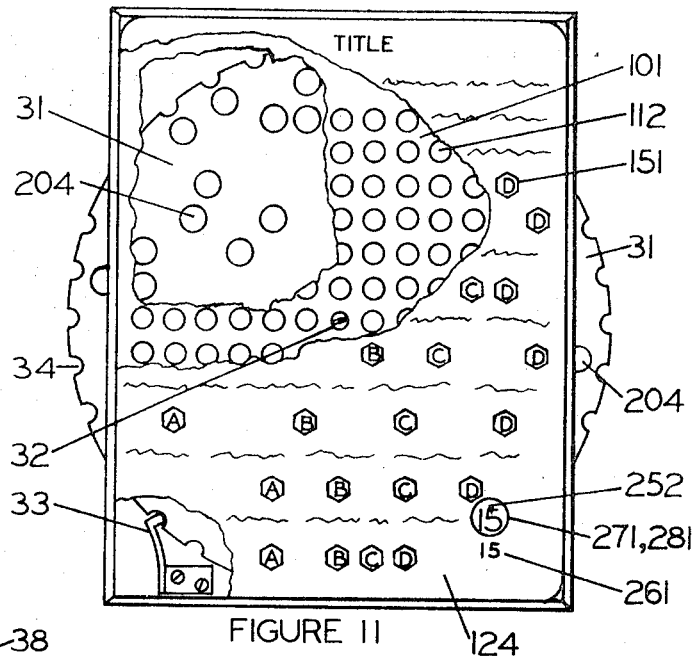
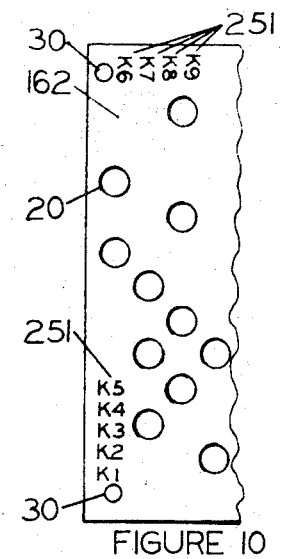
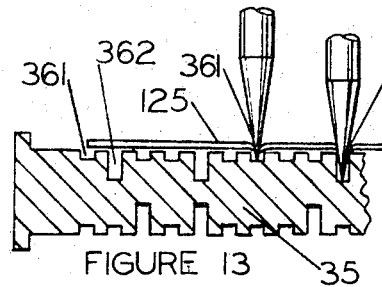
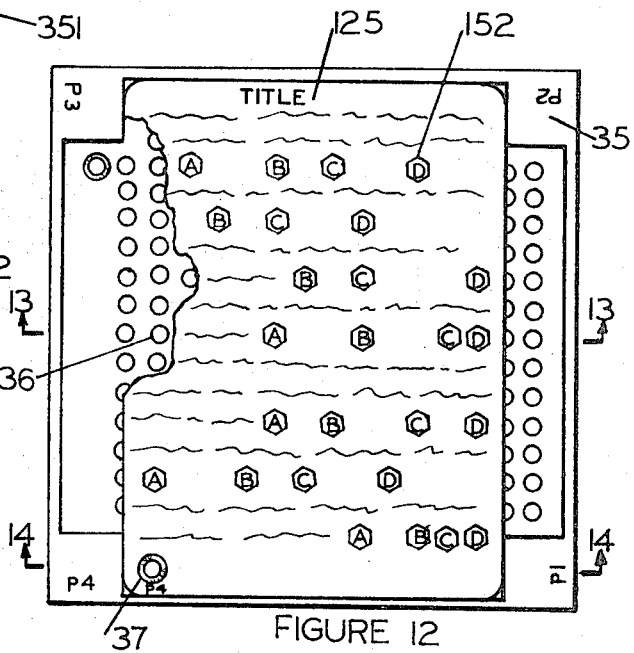
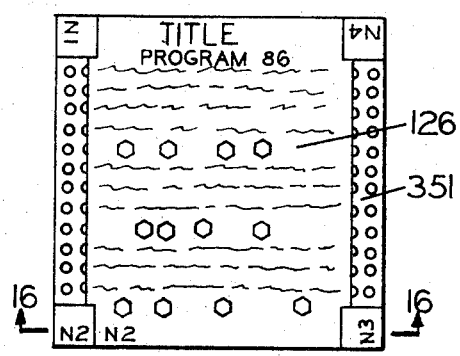
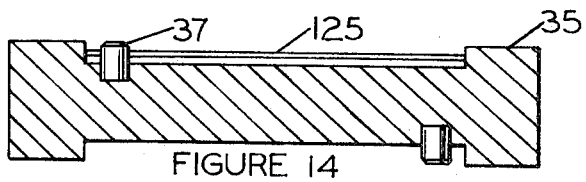

INVENTOR
JAMES RICHARD HARTE

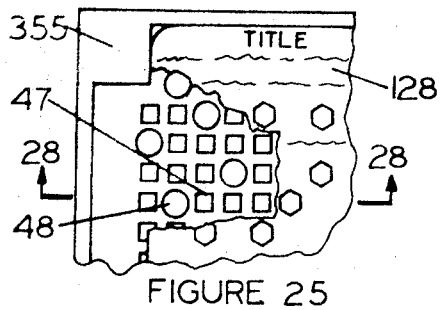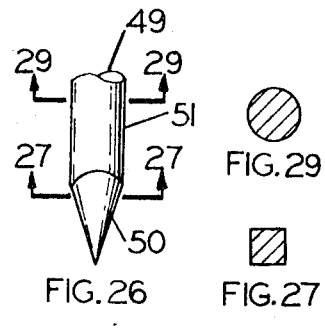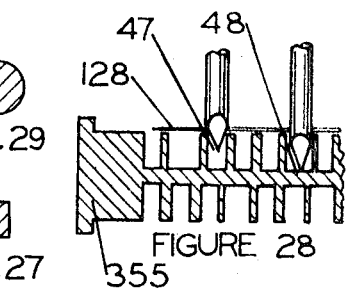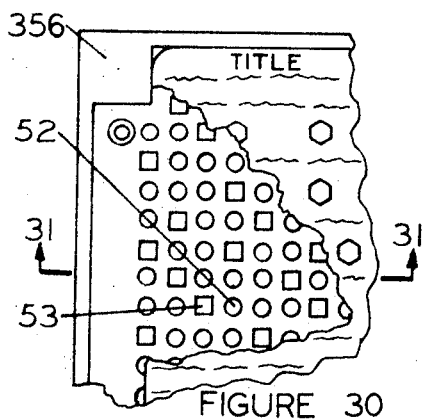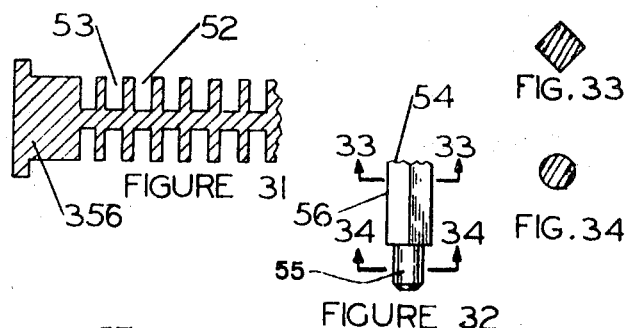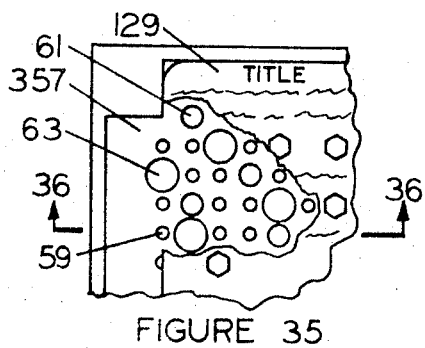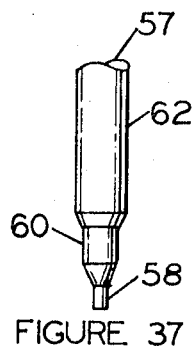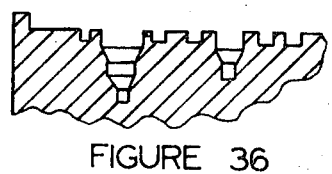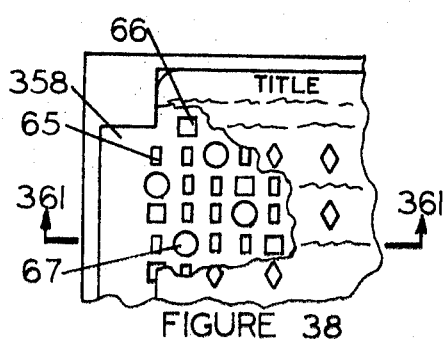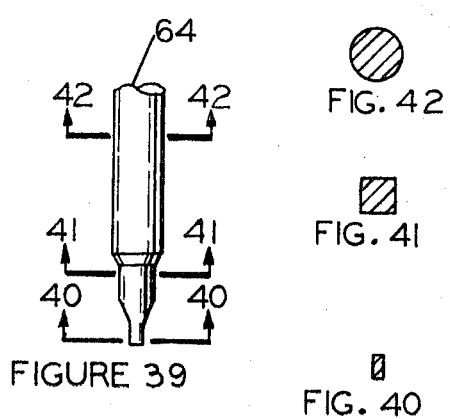

MANUAL SELF-INSTRUCTIONAL AND SELF-TESTING DEVICE

This invention relates to an educational self-instructional and self-testing apparatus for the teaching of all subjects to persons by means of the following, singly or in combination: pictorial illustration; printed instructional material; formats of questions; and answers to multiple choise or true-false type questions. This invention can also be used in conjunction with other means of providing information or questions such as by other printed material, by visual projection means, or by audio tape presentation means.

This apparatus allows the instructor to select programs or formats appropriate to the student's level of comprehension of asubject. With this invention the student can proceed at his own pace in progressing through the educational material. The student also received immediate feedback as to the correctness or incorrectness of his responses to multiple choice questions, true-false questions, or questions that require the matching of information such as with horizontal rows and vertical columns. This invention also allows for the student or instructor to keep a permanent record of his performance in a given area, and to evaluate the student's level of comprehension in different subject areas by referring to the question and answer sheet. Thus it is a simple, practical, and economical way for the instructor to work with a large group of students in individual programmed instructional sequences. This invention allows for a wide variety of types of instructional formats without the use of complex and expensive optical and electronic mechanisms. This invention also allows for a multitude of correct, partially correct, and incorrect response patterns, so that the student does not memorize the pattern of the mechanism, but focuses instead on the content of the instructional material, and accompanying questions. This invention also allows for the instructor to present questions to the student by other means, and to use this mechanism only for responses to the questions. Again an advantage of this apparatus is that it provides for immediate feedback as to the correctness or incorrectness of the student's selection, and also for automatic scoring in this selection process.

In the event the student's first selection is incorrect, this invention allows him to continue selecting possible correct answers until he has selected the correct answer. Thus, in addition to testing the student's comprehension or knowledge this invention is also a teaching mechanism.

Still another object of this invention is to produce an apparatus which is pleasing in appearance, simple in construction and manufacture, free of complex maintenance problems, strong, durable, efficient in operation, and adaptable to a wide range of instructional formats with accompanying questions. Other objects and advantages of this invention and some of its applications will become apparent from the ensuing description which taken with the accompanying drawings discloses by way of example the preferred embodiments of this invention wherein:

FIG. 9 is a partial top view of a self-instructional apparatus that includes locator holes and a locator pin for positioning the answer plate;

FIG. 10 is a partial top view of an answer plate that has locator holes;

FIG. 11 is a top view, partially cutaway of a self-instructional apparatus that has a permanently affixed, rotatable answer plate;

FIG. 12 is a top view, partially cutaway, of a self-instructional apparatus that only requires three parts, question and answer sheet, stylus, and the main frame body;

FIG. 13 is a partial cutaway view along line 13-13 of FIG. 12 showing correct and incorrect answer selections;

FIG. 14 is a cutaway view along line 14—14 of FIG. 12 showing a locator pin used to position the question and answer sheet;

FIG. 15 is a top view of a self-instructional apparatus that uses slots in the main frame to position and hold down the question and answer sheet;

FIG. 16 is a partial cutaway view along line 16—16 of FIG. 15 showing a slot in the main frame being used to position and hold down the question and answer sheet;

FIG. 21 is a partial view of a stylus that has two different diameters with a tapered section connecting them;

FIG. 24 is a partial view of a stylus that has two different diameters;

FIG. 25 is a partial top view, partially cutaway of a self-instructional apparatus that has two different shaped holes in the main frame, and one of the shapes is wider than the other;

FIG. 26 is a partial view of a stylus that has areas with different geometrical shapes;

FIG. 27 is a cutaway view along line 27—27 of FIG. 26 showing a square cross sectional shape;

FIG. 28 is a partial cutaway view along line 28—28 of FIG. 25 showing correct and incorrect answer selections;

FIG. 29 is a cutaway view along line 29—29 of FIG. 26 showing a round cross sectional shape;

FIG. 30 is a partial top view, partially cutaway, of a self-instructional apparatus that has two different shaped holes or depressions in the main frame, and both of the shapes are the same width;

FIG. 31 is a partial cutaway view along line 31-31 of FIG. 30 showing the identical width of two different shaped holes;

FIG. 32 is a partial view of a stylus that has areas with different geometrical shapes;

FIG. 33 is a cutaway view along line 33—33 of FIG. 32 showing a square cross section;

FIG. 34 is a cutaway view along line 34—34 of FIG. 32 showing a round cross section;

FIG. 35 is a partial top view, partially cutaway, of a self-instructional apparatus with three different sized holes or depressions in the main frame;

FIG. 36 is a partial cutaway view along line 36—36 of FIG. 35 and 361-361 of FIG. 38 showing multi cross sectional area holes in the main frame;

FIG. 37 is a partial view of a stylus that has three different diameters;

FIG. 38 is a partial top view, partially cutaway, of a self-instructional apparatus with three different shaped holes or depressions in the main frame;

FIG. 39 is a partial view of a stylus that has areas with three different shapes;

FIG. 40 is a cutaway view taken along line 40—40 of FIG. 39 showing a rectangular cross section;

FIG. 41 is a cutaway view taken along line 41—41 of FIG. 39 showing a square cross section;

FIG. 42 is a cutaway view taken along line 42—42 of FIG. 39 showing a round cross section;

Figure 1:
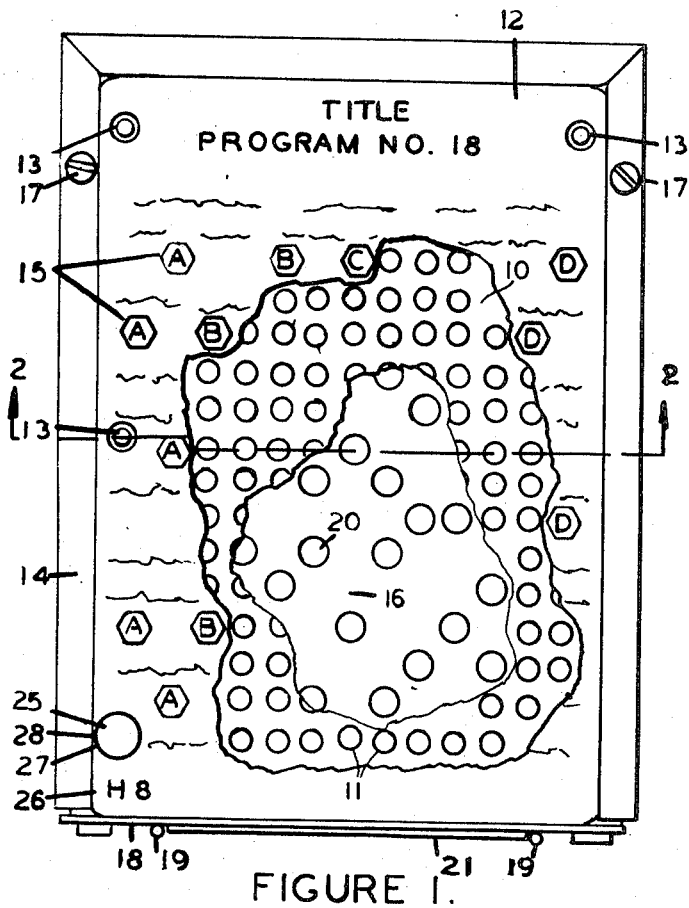
FIG. 1 is a top view, partly cutaway, of a self-instructional apparatus that has a removable answer plate.

One version of a question and answer or teaching apparatus covered by this invention is shown in FIG. 1. The apparatus consists of a permanently installed flat top plate 10 with numerous rows of through holes 11. This apparatus can be constructed in the shape of a square, triangle, circle, or other shape. A rectangular shape whereby holes are arranged on a grid with the rows of holes at 90° to each other is presented in FIG. 1.

An instruction and/or question and answer sheet 12 is positioned on top of plate 10 and aligned with respect to the holes 11 in top plate 10. Conventional alignment methods such as locating pins 13, the edges of the rim 14, or a tapered aligner which would guide the question and answer sheet 12 to the correct position would be used to correctly locate the question and answer sheet 12. A number of indicator zones 15, two or more for each question, corresponding to potentially correct answers are printed in appropriate locations on the question and answer sheet 12. Correct positioning of a question and answer sheet 12 automatically aligns each of the indicator zones 15 directly above one of the through holes 11 in the top plate 10.

A removable answer plate 16 is installed underneath the top plate 10. Sideways alignment of the answer plate 16 is achieved by fitting it between the inside edges of the sides of the rim 14. The answer plate 16 is pushed in until it contacts two stop pins 17 or similar stops, which protrude through and extend down past the top plate 10. After the answer plate 16 is in place, the hinged door 18 is closed on the slightly protruding answer plate 16 and the coiled torsion spring(s) 19 forces the door 18 against the answer plate 16 thereby insuring that it is forced against the stops 17 and is in the correct fore and aft position. Other methods such as a removable end plate instead of a hinged door 18, would also be satisfactory for positioning answer plate 16. Plate 16 has numerous through holes 20 each of which lies directly beneath one of the holes 11 in top plate 10. Said holdes 20 correspond to correct answers.

Figure 2:
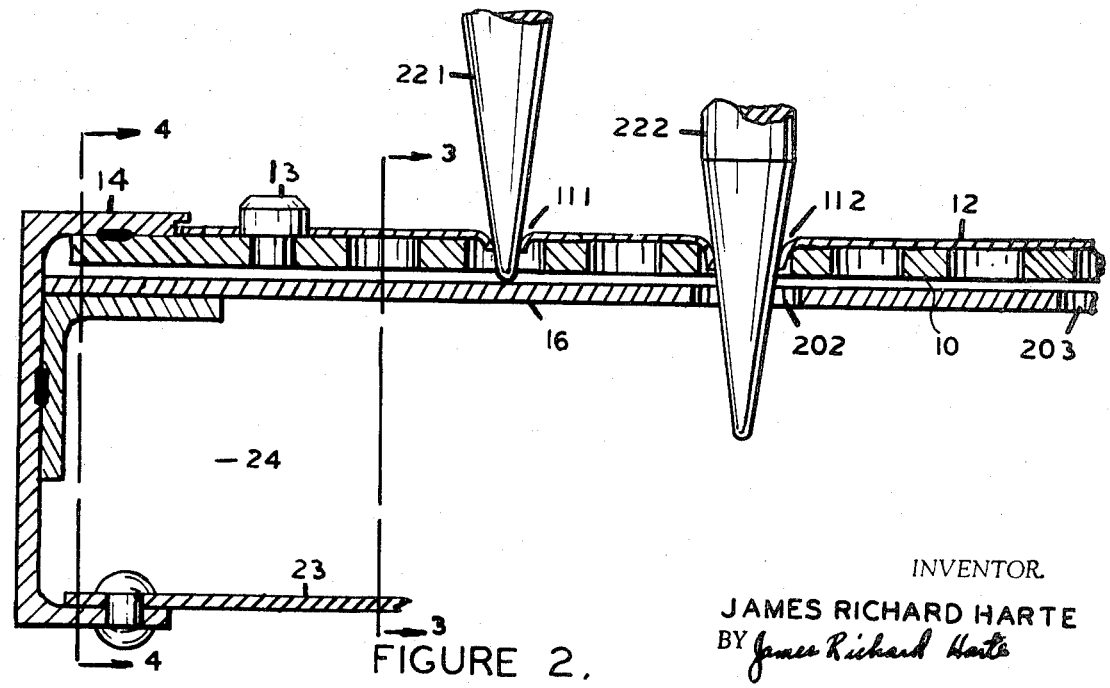
FIG. 2 is a side cutaway view along line 2—2 of FIG. 1 showing correct and incorrect answer selections.

FIG. 2 is a partial section cut along line 2—2 showing correct and incorrect responses. The student indicates his preference for the possible correct answer by pushing the point of a stylus 221 or 222 through the question and answer sheet 12 at the indicator zone that he thinks is correct. For each question one or more of the holes 20 in answer plate 16 is directly beneath the indicator zone(s) 15 which corresponds to the correct answer or answers. During normal operation, each incorrect indicator zone 15 on question and answer sheet 12 will be directly above a hole 11 in top plate 10 but will now be above a hole 20 in answer plate 16. Instead, it will be directly above the solid and impenetrable material of the answer plate 16. If the student pushes the stylus 221 through the question and answer sheet 12 at an incorrect indicator zone, the stylus 221 will pass through the hole 111 in the top plate 10 but because of the shallow depth of hole 111, the stylus 221 will penetrate the question and answer sheet 12 only a short distance. This short distance of penetration results in only a small diameter hole being pierced in the question and answer sheet 12, thereby indicating an incorrect selection. The student can either try again on the same question to determine what the correct answer is or he may proceed to the next question if his objective is to obtain a score of correct vs. incorrect answers.

If the student pushes the stylus 222 through the question and answer sheet 12 at a correct indicator zone, the stylus 222 will penetrate the question and answer sheet 12 to a much greater depth, will pass through the hole 112 in the top plate 10, will also pass clear through the clearance hole 202 in the answer plate 16 and will create a larger diameter hole in the question and answer sheet 12, thereby indicating a correct selection.

As in FIGS. 1 and 2, not all holes 20 in answer plate 16 are necessarily utilized for any particular question and answer sheet; however, answer sheets that utilize all of holes 20 in answer plate 16 can be provided. In FIG. 2 since hole 202 is the correct answer, hole 203 in answer plate 16 would not correspond to any of the indicator zones 15 on the question and answer sheet 12 when there is only one correct answer per question. None of the answer holes 20 or potential indicator zones 15 in some of the horizontal rows of holes in FIG. 1 would be utilized with the question and answer sheet 12 shown in FIG. 1 since much of the space on question and answer sheet 12 in FIG. 1 is filled with instructional materials and/or questions rather than indicator zones 15 for responses to questions.

The bottom plate 23 in FIG. 2, prevents students from observing the locations of the possible correct answers from underneath the machine or by transmitting light through from the bottom. Bottom plate 23 in conjunction with rim 14 and door 18 provides a storage space 24 for storing extra answer plates, instructional booklets, or question and answer sheets.

Figure 3:
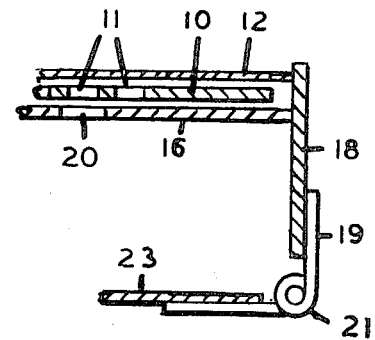
FIG. 3 is a partial cutaway view along line 3—3 of FIG. 2 showing the end plate spring loaded in its normal position where it positions the answer plate and the question and answer sheet into their correct position.

FIG. 3 is a partial section taken along line 3—3 showing the conventional coiled torsion spring 19 which forces the door 18 closed which in turn holds the protruding answer plate 16 and the question and answer sheet 12 in their correct position.

Figure 4:
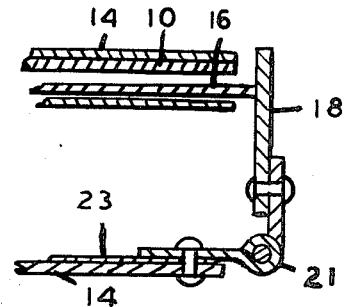
FIG. 4 is a partial cutaway view along line 4—4 of FIG. 2 showing a hinging method for fastening the end plate.

FIG. 4 is a partial section taken along line 4—4 showing the conventional hinge 21 used to fasten the door 18 to the bottom of rim 14.

Figure 5:
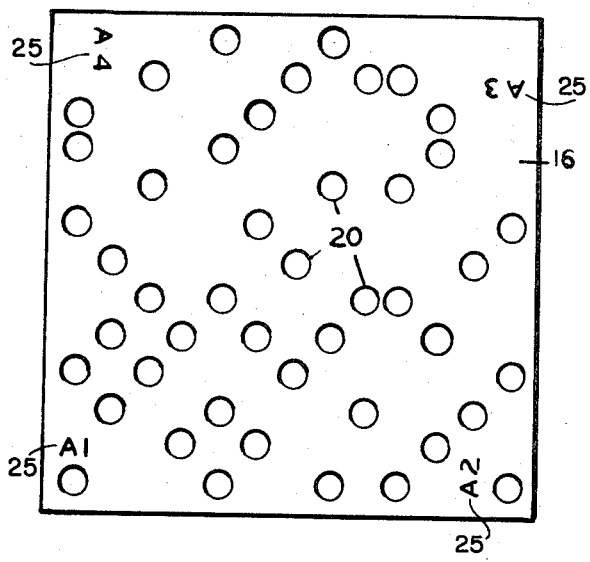
FIG. 5 is a view of one side of an answer plate.

FIG. 5 is a view of one side of the removable answer plate 16. It is removable so that other answer plates with different patterns of correct responses, holes 20, can be installed on the machine. Different patterns of correct responses, holes 20, can also be obtained by turning the answer plate over and reinserting it or by turning it around and inserting the opposite end first. The answer plate can also be made square such as the answer plate 16 shown in FIG. 5. Then by having previously selected certain combinations of hole patterns for answer plate 16, and by rotating answer plate 16 through four 90° increments between withdrawals and reinsertions, four different sets of correct responses, holes 20, can be obtained from a single surface. However, also by turning it over and again rotating it through four 90° increments between withdrawing it from rim 14 and reinserting it again eight different sets of correct responses, holes 20, can be obtained from a single answer plate. Any number of different answer plates can be used on any machine to provide for additional sets of correct answer spaces, holes 20. Symbols 25 are positioned on each answer plate 16 such that one symbol 25 will appear through both an opening 27 in the top plate 10 and a correspondingly located hole 28 in question and answer sheet 12 as shown in FIG. 1. Question and answer sheet 12 in FIG. 1 is coded with a similar identification symbol 26 adjacent to hole 28. The student or instructor would need to ascertain that the symbol 25 on the answer plate 16 corresponds to the identification 26 on the question and answer sheet 12.

FIG. 5 is also the top view of an instructor's scoring master. The scoring master is made of a transparent material such as clear plastic. Holes in the scoring master correspond identically to the holes 20 in answer plate 16 for a specified pattern and position. Holes 20 in the answer plate 16 and corresponding holes in the scoring master indicate possible correct responses. The scoring master is coded with the same symbols 25 as the corresponding question and answer sheets 12 and the answer plate 16. To check a student's work the instructor properly positions the transparent scoring master over the student's question and answer sheet making sure that the position and symbols of the scoring master correspond to the question and answer sheet 12. The scoring master would allow the instructor to determine if the correct answer plate 16 had been properly positioned and if the correct question and answer sheet 12 had been used and had been properly positioned.

The scoring master would also allow the instructor to determine if the student had made any false positive responses by rotating the stylus in hole 11 of the top plate 10 after making an incorrect response. Rotating the stylus around the edge of the hole 11 of an incorrect response can give the impression that a correct response has been made unless it is checked by a scoring master, or by a similar method.

Figure 6:
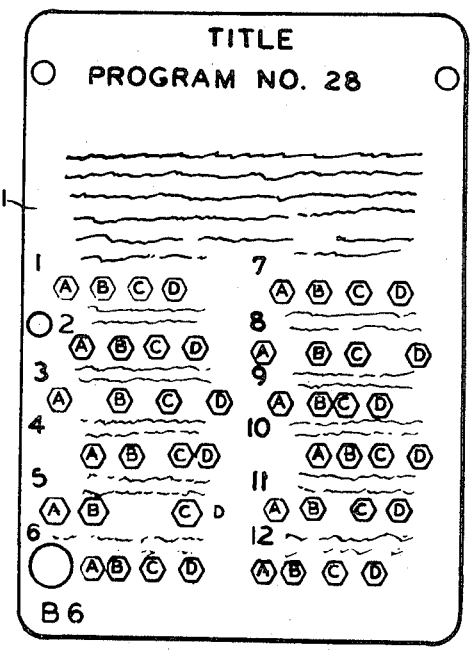
FIG. 6 shows a question and answer sheet that also provides instructional material.
Figure 7:
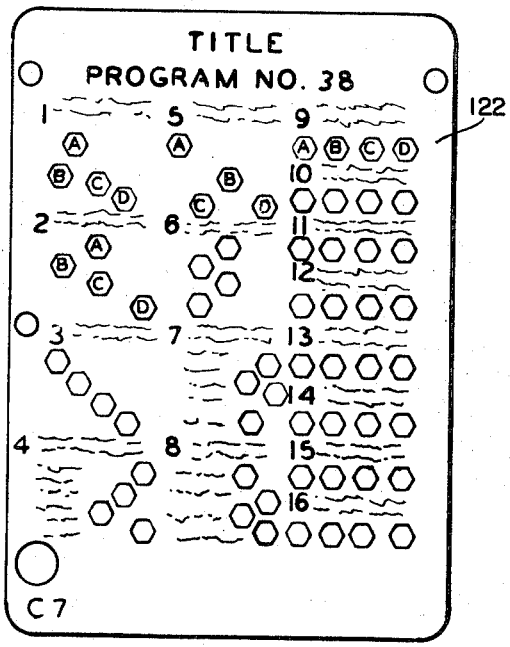
FIG. 7 shows a question and answer sheet that has multiple columns of questions and answers.
Figure 8:
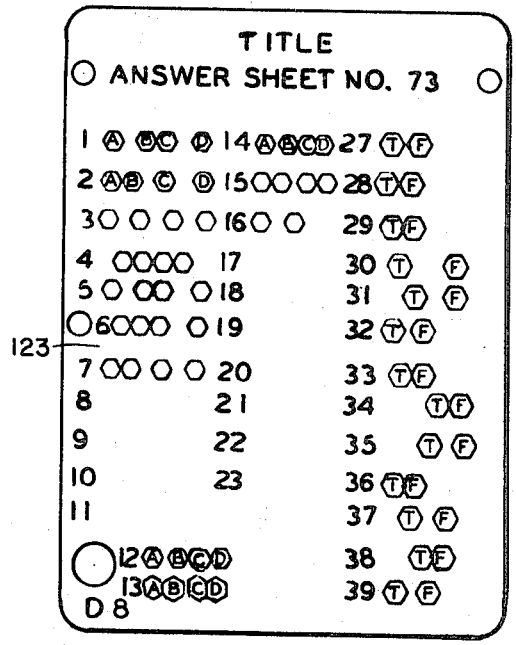
FIG. 8 shows an answer sheet that does not include questions.

This apparatus has the flexibility to use many different instructional and/or question and answer formats. FIG. 6 is a question and answer sheet 121 that incorporates instructional material at the top, followed by two columns of questions and answers or two columns of additional instructions, questions, and answers. FIG. 7 is a question and answer sheet 122 that has three columns of questions and answers. FIG. 8 is an answer sheet 123 with multiple columns of answers: two columns of multiple choice answers and one column of true-false answers.

A single answer plate can also be used to provide a number of patterns of potentially correct response holes 20 at different locations on the question and answer sheet by installing the answer plate at different horizontal positions in the apparatus. This allows one to double, triple, or quadruple the number of correct answer patterns that can be obtained from a single answer plate. Any number of conventional locating methods can be used to locate the answer plate at these different locations. FIG. 9 is a partial top view of an apparatus which is the same as the one shown in FIG. 1, except that it shows a method for correctly locating the answer plate at different positions with respect to the top plate and the question and answer sheet. the locator pin 171, in FIG. 9, is removable and can be inserted with the aid of threads or a clearance fit into any one of the locator holes 29 in the rim 141. The spacing between one locator hole 29 and the next adjacent locator hole 29 shown in FIG. 9 is the same as the spacing between one row of top plate holes 11 and the next row of top plate holes 11 shown in FIG. 1. Thus holes 20 in the answer plate always line up with holes 11 in the top plate.

FIG. 10 is a partial view of an answer plate 162 that includes locator holes 30 that will line up with one of the locator holes 29 in the rim 141. The locator pin 171 is then inserted through the selected locator hole 29 and also through the similar locator hole 30 in the answer plate 162. Additional symbols 251 need to be included on the answer plate 162 to coincide with the additional answer plate locations. Flexibility can thus be provided to vary the indicator zones 15 that are correct and incorrect, which keeps the student from focusing on learning a single pattern of spacing of indicator zones 15, and of assuming that the same space is always correct or incorrect.

FIG. 11 shows a variation of the question and answer apparatus shown in FIG. 1. It uses many of the same features as the FIG. 1 apparatus but uses a single permanently affixed rotating answer plate 31 instead of the removable answer plate 16. This answer plate 31 is permanently installed under the top plate 101 via a center shaft 32 upon which it can be rotated. The answer plate 31 is rotated about center shaft 32 to any one of the many pre-established positions. The answer plate 31 can be indexed to the various acceptable positions by any conventional rotational index method. The method shown in FIG. 11 uses a detent system whereby a spring loaded member 33 is positioned in any of the several notches 34 in the rotating answer plate 31. However, other standard index methods would be equally satisfactory. Through-holes 204 would be located in the rotatable answer plate 31 in a manner such that as the answer plate 31 were rotated to a particular position, some of the through-holes 204 would line up with some of the holes 112 in the top plate 101. Some of these holes 204 would then correspond to the indicator zones 151 for correct answers on the question and answer sheet 124. Symbols 252 are positioned on the rotating question and answer plate 31 such that one symbol 252 will appear through an opening 271 in the top plate 101 and a correspondingly located hole 281 in question and answer sheet 124. Question and answer sheet 124 is coded with a similar identification symbol 261 adjacent to hole 281. Only one symbol 252 is shown on the rotating question and answer plate 31 in FIG. 11; however, there would be one symbol 252 on plate 31 for each correct position for the rotating plate 31.

Another version of the question and answer or teaching apparatus as provided by this invention includes a single main frame or plate member which has holes of two or more different depths and/or shapes integral in the body of the frame. A stylus will not penetrate the shallow or restricted area holes, which represent incorrect answers, as far as it will the deeper or increased area holes, which represent correct answers. Therefore a conical or specially shaped stylus will make larger holes in the question and answer sheet at correct response locations than it will at incorrect locations. FIG. 12 is an example of this apparatus. The question and answer sheet 125 is installed on frame 35 for its normal operation. Question and answer sheet 125 can be positioned within frame 35 as shown in FIG. 12; via locating pins as in FIG. 1; or by other conventional locating methods. Correct positioning of the question and answer sheet 125 on the frame 35 aligns each of the indicator zones 152 above one the holes 36 in the top surface of frame 35.

FIG. 13 is a partial section cut along line 13—13 showing shallow holes 361 for incorrect responses and deeper holes 362 for correct responses, such holes 361 and 362 extending into the unitary body of the frame 35 from both of the flat, top and bottom surfaces thereof. Determination of whether a correct or an incorrect response has been made is similar to that described for the apparatus shown in FIG. 1. By including holes on both top and bottom of frame 35 and by shaping frame 35 in a rectangle or a square, as indicated in FIG. 12, eight different combinations of potentially correct answer patterns can be obtained from each frame 35.

The question and answer sheet 125 can be positioned and/or held in place via a single locating pin 37 in conjunction with the sides and ends of the frame 35 as shown in FIG. 12 and in FIG. 14, which is a section taken along line 14—14 of FIG. 12. Other conventional holding methods such as spring clips, removable hold down pins, or undercuts in the sides of the frame 35 would also be satisfactory for positioning the question and answer sheet 125. FIG. 15 shows a frame 351 similar to frame 35 in FIG. 12 except that it uses undercuts to position and/or hold down the question and answer sheet. FIG. 16, which is a partial section cut along line 16—16 of the frame 351, shows the undercuts 38 used to position and hold down the question and answer sheet 126.

Figure 17:
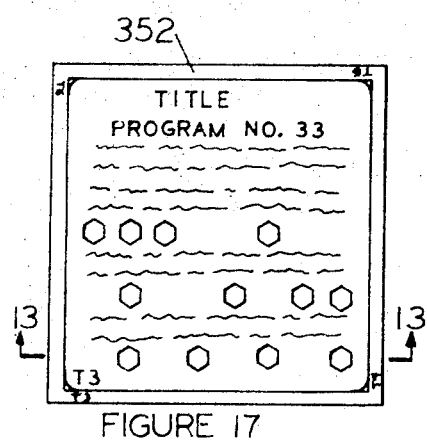
FIG. 17 is a top view of a self-instructional apparatus with a square main frame that utilizes a square question and answer sheet.
Figure 18:
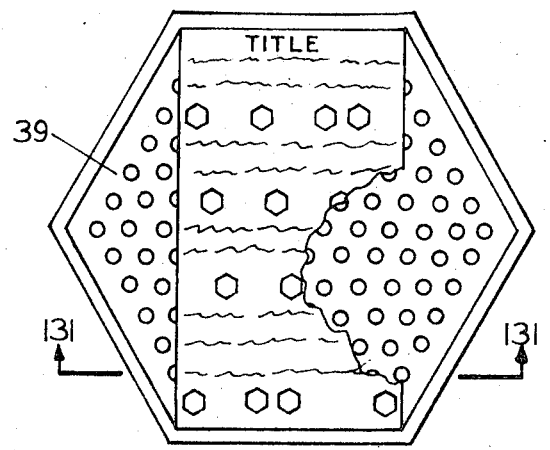
FIG. 18 is a top view, partially cutaway of a self-instructional apparatus with a hexagonal main frame that uses a rectangular question and answer sheet.
Figure 19:
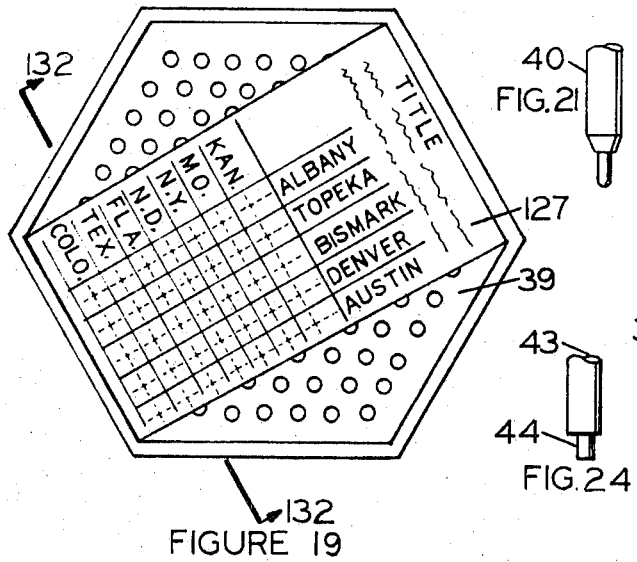
FIG. 19 is a top view of a self-instructional apparatus with a hexagonal main frame that uses a rectangular question and answer sheet which includes horizontal rows of information that are to be matched with vertical columns of information.

A square frame 352 as shown in FIG. 17 would provide for use of a square question and answer sheet, which would completely cover all of the holes in the top surface of frame 352 in each of the four answer sheet positions. Other shapes such as octagonal or indexing circles can be used to provide more than eight possible combinations of potentially correct answers for each frame 35. For example, FIG. 18 represents a hexagonal shaped frame 39 that will provide for 12 different question and answer sheet positions, six on each side. FIG. 19 shows a question and answer sheet 127 installed in frame 39 in a different orientation than the one shown in FIG. 18. A partial cut along either line 131—131 or 132—132 would appear very similar to the section shown in FIG. 13.

The question and answer sheet 127 in FIG. 19 has a grid consisting of horizontal rows of information that are to be matched up with vertical columns of information.

Figure 20:
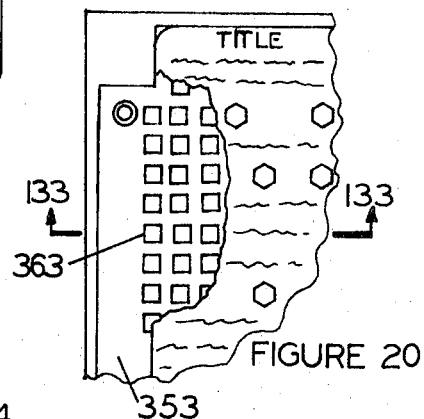
FIG. 20 is a partial top view, partially cutaway of a self-instructional apparatus that uses square holes or recessions in the main frame.

Only round holes that permitted a tapered or similar stylus to make either small or large holes in the question and answer sheet have been described in the versions of the teaching apparatus represented by FIGS. 1 through 19, inclusive. However, this invention relates to determination of correct vs. incorrect answer selection by creating different sized holes in a question and answer sheet by a stylus, without regard to hole shape. Numerous hole and stylus types, sizes, and shapes can be used advantageously in the manufacture and use of this teaching apparatus. A partial top view of one version of a single main frame 353 using all square holes 363 is shown in FIG. 20. A partial section taken along line 133—133 would be the same as that shown in FIG. 13. Square or other shaped holes may be more economical to produce than round holes in molded or cast frames 353 since the protrusions on the mold can be more easily machined in the surface of the mold.

This teaching apparatus includes the flexibility to use different shapes of styluses, sometimes any of several on the same version of the apparatus and in some instances specially shaped styluses for certain configurations of holes. Only conical styluses have been shown in any of the FIGS. 1 through 20, inclusive. However, numerous other shapes would have also been satisfactory and in some instances, advantageous. For example, the stylus 40 shown in FIG. 21 could be used to replace the plain conical stylus in all of the types of apparatus described in FIGS. 1 through 20. For some designs, the stylus 40 could help reduce the frame thickness thereby conserving on material and storage space.

Figure 22:
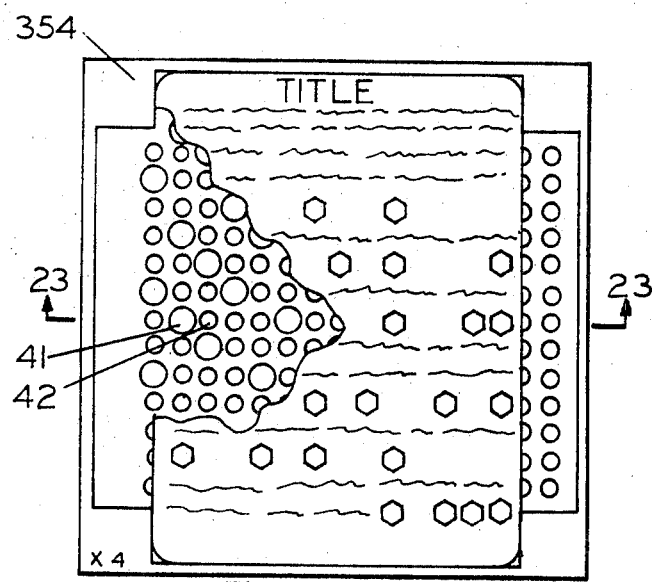
FIG. 22 is a top view, partially cutaway of a self-instructional apparatus that has two different sizes of holes or depressions, both of the same or similar geometry, in the main frame.
Figure 23:
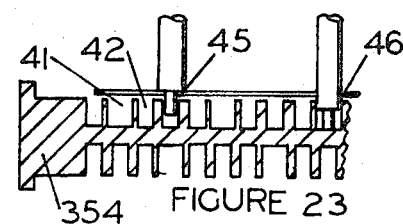
FIG. 23 is a partial cutaway view along line 23—23 of FIG. 22 showing correct and incorrect answer selections.

Other stylus designs with corresponding hole shape changes can be used to help make it more difficult for the operator to cheat. One such apparatus is shown in FIG. 22. The frame 354 of FIG. 22 has two sizes of holes, each size with a different cross sectional area, large holes 41 and small holes 42. The holes shown in FIG. 22 are round but as in the other apparatuses described in FIGS. 1 through 19, they could be square, triangular, or other convenient shape. The large holes 41 are for correct answers and the small holes 42 are for incorrect answers. FIG. 23 is a partial sectional view cut along line 23—23 showing correct and incorrect responses. Several types of styluses: conical, stylus 40 in FIG. 21, or a stylus with a more abrupt change in cross sectional area such stylus 43 shown in FIG. 24 could be used with this apparatus. Since the small holes 42 would accept only the small tip 44 of the stylus 43, a small hole 45 in the question and answer sheet would indicate an incorrect answer as shown in FIG. 23. Since the large holes 41 would accept the full cross sectional area of stylus 43, a large hole 46 in the question and answer sheet would indicate a correct answer selection as shown in FIG. 23. The small holes 42 in frame 354 make it more difficult for the user to enlarge the holes of incorrect responses in the question and answer sheet, thereby making checking or scoring easier.

A cone or similar stylus could also be used with this style frame 354. The frame 354 as shown in FIG. 22 could also be fabricated from a thin plate. The large holes 41 and the small holes 42 would then all be through holes, extending clear through the thin plate. This could save material or fabrication cost and the operational method would be the same as for the frame 354 shown in FIG. 23.

Another version of the apparatus partially shown in FIG. 25 has small square or other shaped holes 47 for incorrect responses and large round holes 48 for correct responses. A shaped stylus 49 as shown in FIG. 26 would be used in conjunction with frame 355 of FIG. 25. The tip 50 of stylus 49 is shaped to fit the small shaped holes 47. The shape of tip 50 is shown in FIG. 27 which is a section through stylus 49 taken at line 27—27. The tip 50 would make only a small hole in the question and answer sheet 128 as shown in FIG. 28 which is a partial section cut along line 28—28 of FIG. 25. The shank 51 of stylus 49 is larger in cross section than the tip 50. FIG. 29 is a section through the shank 51 of stylus 49 taken at line 29—29. The shank 51 would fit only the large holes 48 of frame 355 and would make a large hole in the question and answer sheet 128 as shown in FIG. 28. Thus correct answer selections will produce larger holes in the question and answer sheet 128 than incorrect answer selections.

FIG. 30 is a partial top view of another version of the apparatus which incorporates both round holes 52 and square or other shaped holes 53 in frame 356. The diameter of the round holes 52 is the same size as the width of the shaped holes 53. This is shown in FIG. 31 which is a partial sectional view cut along line 31—31 of FIG. 30. Stylus 54 as shown in FIG. 32 has a round tip 55 with a diameter equal to the minimum width of the shaped shank 56. FIG. 33 is a sectional view of the shaped shank 56 of stylus 54 cut along line 33—33 of FIG. 32. FIG. 34 is a sectional view of the round tip 55 of stylus 54 cut along line 34—34 of FIG. 32. The round tip 55 of stylus 54 will fit in all the holes 52 and 53 of frame 356 in FIG. 30 and will create a small round hole in the question and answer sheet. If only the round tip 55 will fit in a hole in frame 356, the small hole thus created in the question and answer sheet will indicate an incorrect answer selection. The square shank 56 of stylus 54 will fit in only the square holes 53 of frame 356 and will make a larger hole in the question and answer sheet thereby indicating a correct answer selection. Stylus 54 could be used satisfactorily in frames with shallow holes or with through holes, thereby enabling the use of thin frames with the accompanying advantageous reduction in material usage, part storage, and part weight.

The question and answer apparatuses or teaching machine configurations described in FIGS. 1 through 34, inclusive, have all shown or implied that only two hole sizes were used. Large holes were used to denote correct answer selections and small holes were used to denote incorrect answer selections. Since this invention involves creation of different hole sizes in question and answer sheets to determine whether correct, partially correct, or incorrect answer selections have been made, some versions of the apparatus would provide for creation of more than two sizes of holes in the question and answer sheets. FIG. 35 is a partial top view of a teaching apparatus that has three different sized holes in the frame 357. FIG. 36 is a partial, sectional view of frame 357 cut along line 36—36. A stylus 57 as shown in FIG. 37 which has three different cylindrical diameters would be used with frame 357. The small cylinder 58 of stylus 57 would be the only one which would fit in the small holes 59 of frame 357. Small holes 59 would correspond to an incorrect answer and the small hole created in the question and answer sheet 129 by the small cylinder 58 would indicate this. The medium sized cylinder 60 of stylus 57 would be the largest cylinder of the stylus 57 that would fit in the medium sized holes 61 of frame 357. The medium sized cylinder 60 would thus make a medium sized hole in the question and answer sheet 129 which would indicate a partially correct, or close, answer selection. The largest cylinder 62 of stylus 57 would fit in the large holes 63 of frame 357. The large cylinder 62 would then make a large hole in the question and answer sheet 129 which would indicate a correct answer selection.

In a similar manner, any sized hole could be used for any weighted answer or to verify a correct step in a sequence problem. Verification of whether or not the correct step or sequence is being followed is an important aspect of learning subjects like mathematics, physics, and engineering. The use of various sized holes in the question and answer sheet 129 to coincide with various sequential steps will often times enable the student to learn faster than merely providing him with the knowledge that his selection was either right or wrong.

Frame 357 can also be made from a thin plate by making each of the three different size holes 59, 61, and 63 to be a single diameter hole extending through the plate. This would enable a saving in material cost, part weight, and storage space.

Frame 358 in FIG. 38 uses the same principle as frame 357 in FIG. 35 except that the different sized holes are also different shapes. A partial section taken along line 361—361 would be the same as that shown in FIG. 36. This apparatus would use the stylus 64 shown in FIG. 39 which has three different shapes as shown in FIGS. 40, 41, and 42, which are sections cut through lines 40—40, 41—41, and 42—42 of stylus 64, respectively. These different shapes on the stylus would fit in correspondingly shaped holes 65, 66, and 67 in frame 358. The end result with this apparatus would be the same as that described for frame 357 in FIG. 35. Different sized holes would be created in the question and answer sheet for different degrees of correctness or different sequential steps of a problem.

Figure 43:
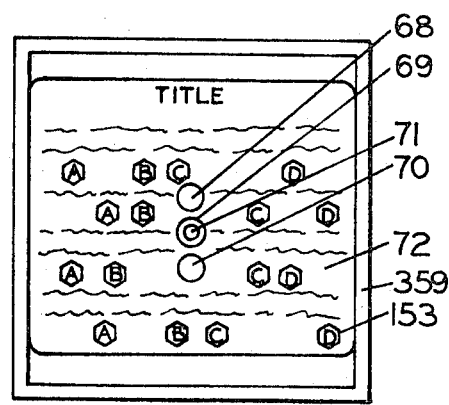
FIG. 43 is a top view of a self-instructional apparatus that uses a locator pin in the main frame and locator holes in the question and answer sheet to vary the positioning of the question and answer sheet with respect to the correct answer patterns.

Question and answer sheets used with frame 359 in FIG. 43 have one or more special locator holes 68, 69, and 70 that fit over a locator pin 71 which is in the frame 359. The use of locator holes positioned at different places on the question and answer sheet provide for additional correct answer patterns. Thus, if the question and answer sheet 72 shown in FIG. 43 were moved up so that hole 70 were positioned on the locator pin 71, the indicator zones 153 would be positioned over a different row of holes in the frame 359 and there would therefor, be a different correct answer pattern. The question and answer sheet 72 shown in FIG. 43 has three different locator holes all positioned along a single line. Locator holes could also be positioned elsewhere, such as to the right or left. Question and answer sheets could also be provided with only one locator hole positioned at any one of several different satifactory positions. A single locator hole or a pair of locator holes in conjunction with a pair of locator pins would help insure that the question and answer sheet was installed in the correct position.

What is claimed is:

1. Educational apparatus comprising:
    an instructional sheet having zones thereon for indicating answers elected in response to questions;
    a unitary plate member provided with a pair of opposed, flat surfaces for receiving said sheet and each having a number of holes therein extending only partially through said member,
    said holes in each surface being of at least two different configurations for indicating whether answers selected on said sheet are correct, and the arrangement of the hole configurations providing different and independent patterns of correct answer holes for the respective surfaces,
    said sheet having means thereon designating the surface having the correct answer hole pattern corresponding to the zones on said sheet representing correct answers;
    means on said member for holding said sheet in overlying relationship with the designated surface in a predetermined position where said zones are aligned with certain of the holes in the designated surface in accordance with the answers represented by said zones whereby, in making up said sheet, either surface may be designated depending on the pattern desired; and
    a stylus for punching through selected zones into the holes therebeneath, whereby the configurations of the punched openings indicate the correctness of the selected answers.

2. The apparatus as claimed in claim 1, wherein said predetermined position of the sheet is one of a plurality of possible positions in overlying relationship with the designated surface.

3. The apparatus as claimed in claim 2, wherein said plate member is rectangular, said plurality of possible positions being four in number.

4. The apparatus as claimed in claim 2, wherein said plate member is hexagonal, said plurality of possible positions being six in number. pg,26

5. The apparatus as claimed in claim 1, wherein said holes in each surface are of at least two different depths, presenting said different configurations.

6. The apparatus as claimed in claim 1, wherein said holes in each surface are of at least two different cross-sectional sizes, presenting said different configurations, and wherein said stylus is provided with a shank having a tip and at least one adjacent shank portion corresponding to the respective sizes of said holes for mating therewith when the stylus is punched through the selected zones.

7. The apparatus as claimed in claim 1, wherein said holes in each surface are of at least two different cross-sectional geometric shapes, presenting said different configurations, and wherein said stylus is provided with a shank having a tip and at least one adjacent shank portion corresponding to the respective shapes of said holes for mating therewith when the stylus is punched through the selected zones.

8. The apparatus as claimed in claim 1, wherein there are three of said different configurations for indicating whether answers selected on said sheet are correct, partially correct, or incorrect, and wherein said stylus is provided with a shank having a tip and two adjacent shank portions corresponding to the respective configurations of said holes for mating therewith when the stylus is punched through the selected zones.

9. Educational apparatus comprising:
    an instructional sheet having zones thereon for indicating answers selected in response to questions;
    a plate member provided with a flat surface for receiving said sheet and having a number of holes therein of at least two different cross-sectional geometric shapes for indicating whether answers selected on said sheet are correct;
    means on said member for holding said sheet in overlying relationship with said surface in a predetermined position where said zones are aligned with certain of the holes in said surface in accordance with the answers represented by said zones; and
    a stylus for punching through selected zones into the holes therebeneath, and provided with a shank having a tip and at least one adjacent shank portion corresponding to the respective shapes of said holes for mating therewith when the stylus is punched through the selected zones, whereby the shapes of the punched openings indicate the correctness of the selected answers.

10. Apparatus as claimed in claim 9, wherein there are three of said different geometric shapes for indicating whether answers selected on said sheet are correct, partially correct, or incorrect.

11. Educational apparatus comprising:
    an instructional sheet having zones thereon for indicating answers selected in response to questions;
    a unitary, opaque plate member provided with a flat surface for eceiving said sheet and having a number of holes therein extending only partially through said member,
    said holes in the surface being of at least two different configurations for indicating whether answers selected on said sheet are correct;
    means on said member for holding said sheet in overlying relationship with said surface in a predetermined position where said zones are aligned with certain of said holes in accordance with the answers represented by said zones; and
    a stylus for punching through selected zones into the holes therebeneath, whereby the configurations of the punched openings indicate the correctness of the selected answers.

12. The apparatus as claimed in claim 11, wherein said holes in the surface are of at least two different cross-sectional geometric shapes, presenting said different configurations, and wherein said stylus is provided with a shank having a tip and at least one adjacent shank portion corresponding to the respective shapes of said holes for mating therewith when the stylus is punched through the selected zones.

13. The apparatus as claimed in claim 11, wherein there are three of said different configurations for indicating whether answers selected on said sheet are correct, partially correct, or incorrect, and wherein said stylus is provided with a shank having a tip and two adjacent shank portions corresponding to the respective configurations of said holes for mating therewith when the stylus is punched through the selected zones.

* * * * *